July 7, 1936.  R. F. MACFARLANE  2,046,832
MACHINE FOR DISCHARGING BISCUITS FROM PANS
Filed Nov. 10, 1934   5 Sheets-Sheet 1

Inventor
Robert F. Macfarlane
By George B. Willey
Attorney

July 7, 1936.  R. F. MACFARLANE  2,046,832
MACHINE FOR DISCHARGING BISCUITS FROM PANS
Filed Nov. 10, 1934   5 Sheets-Sheet 2
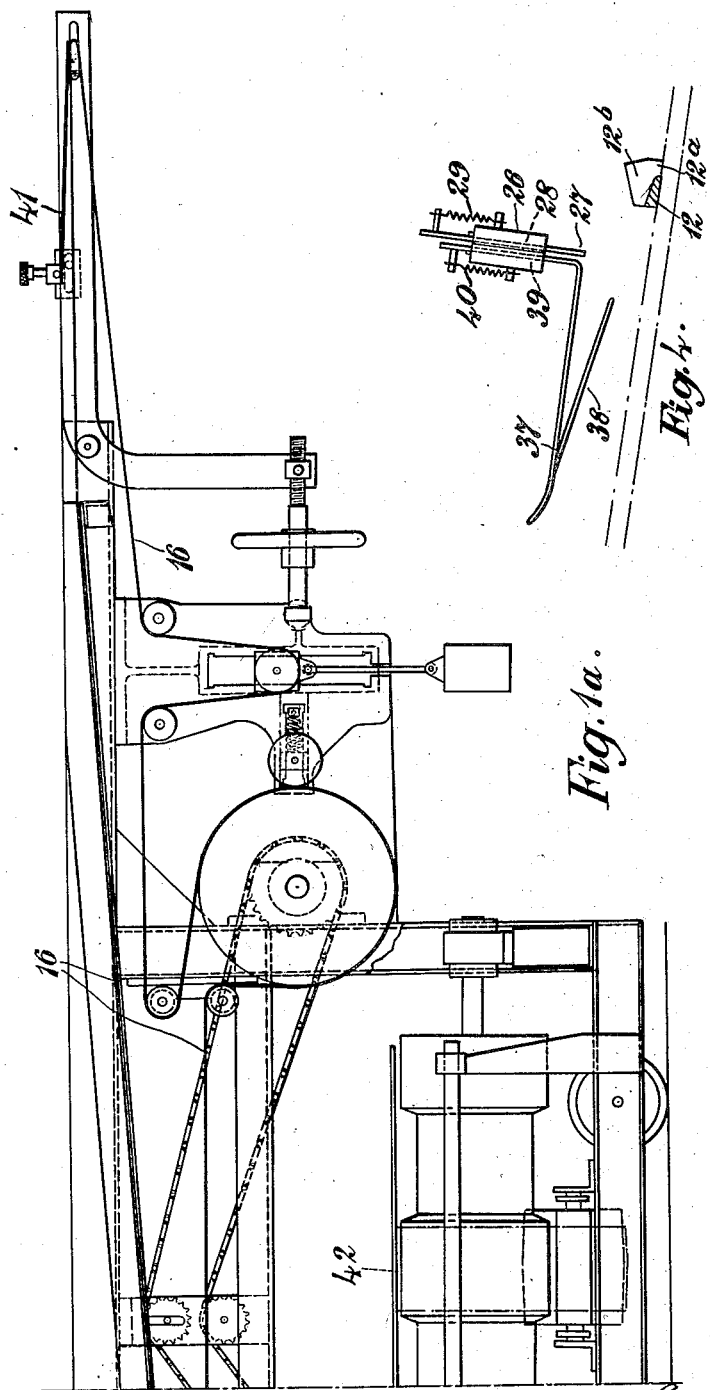

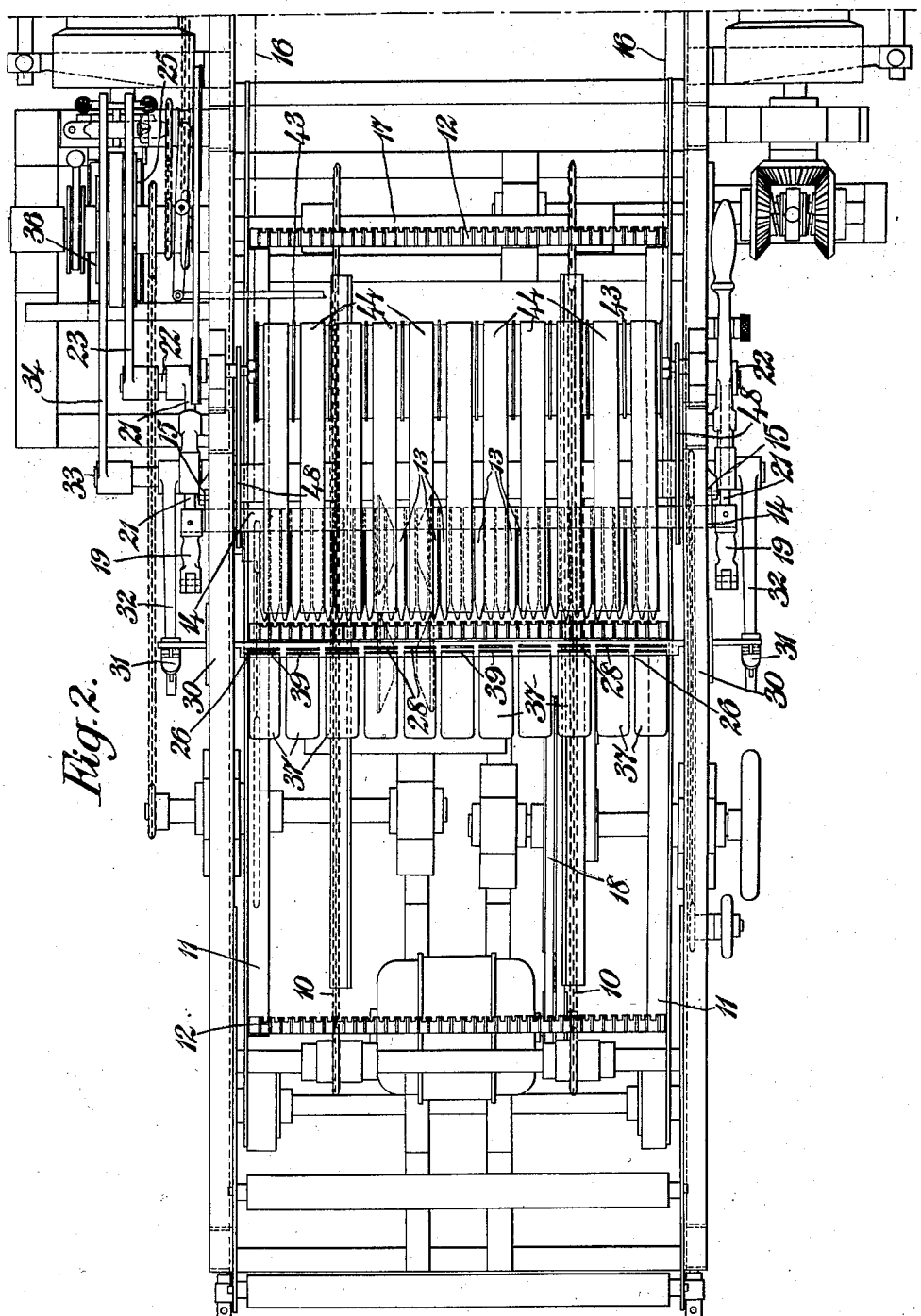

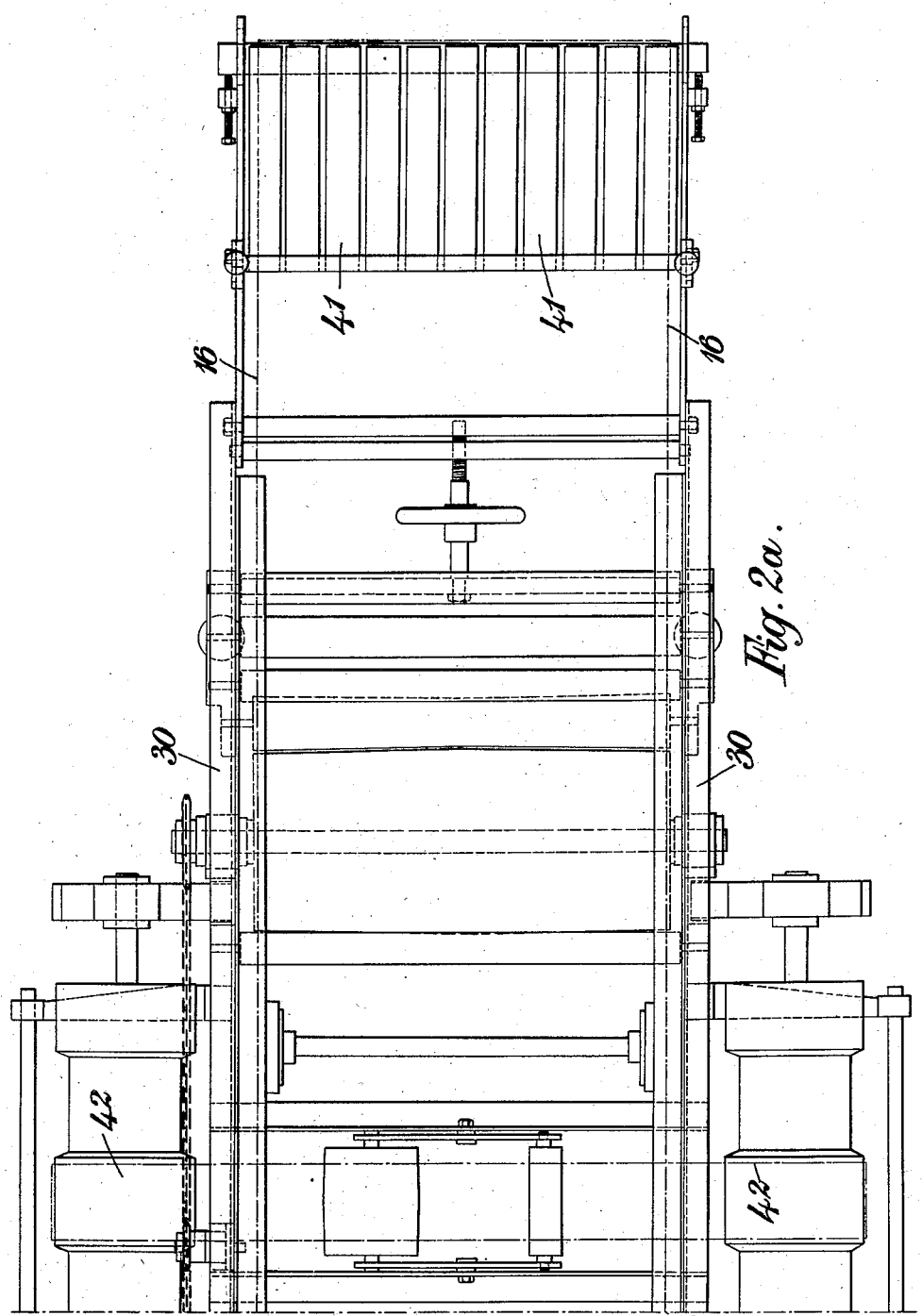

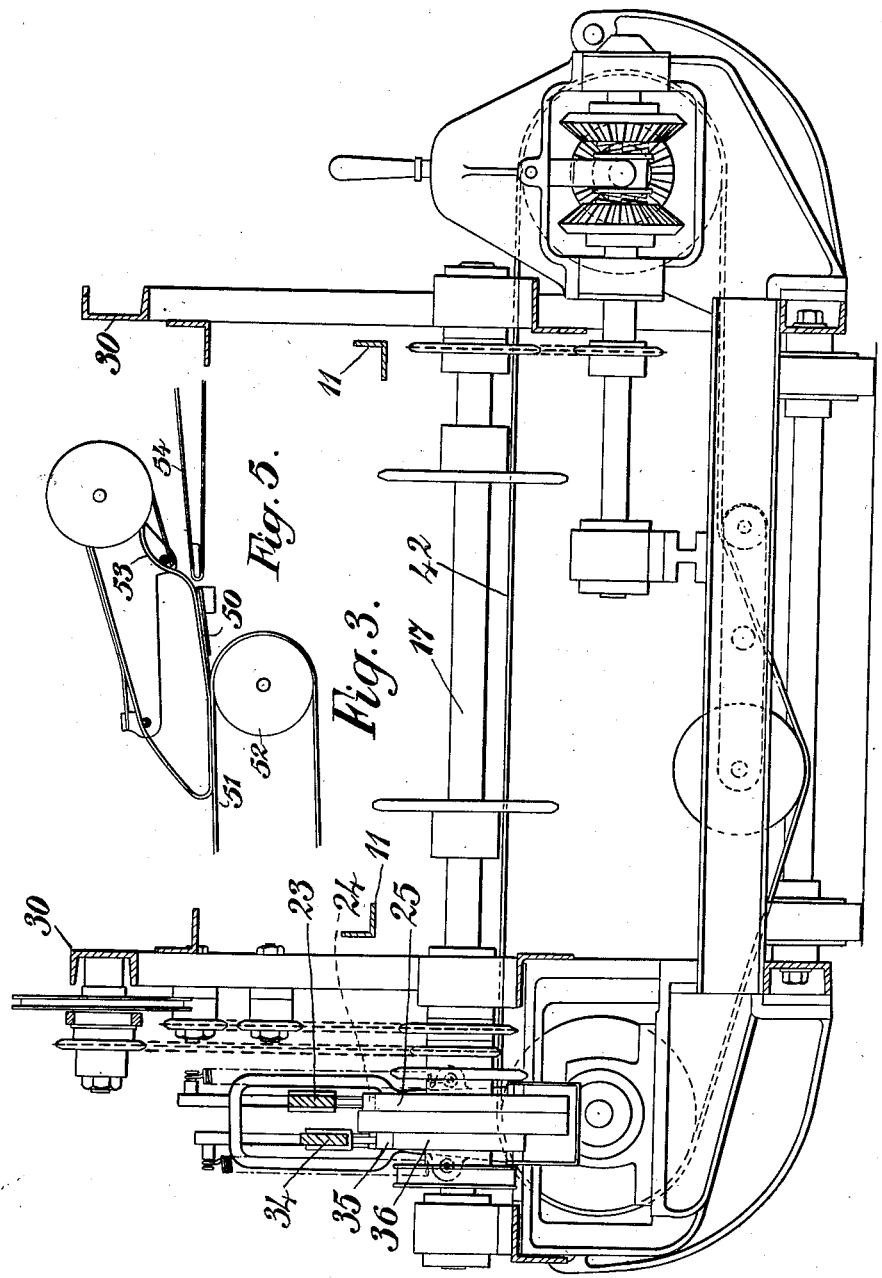

Patented July 7, 1936

2,046,832

UNITED STATES PATENT OFFICE 2,046,832

MACHINE FOR DISCHARGING BISCUITS FROM PANS

Robert French Macfarlane, Osterley, England, assignor to Baker Perkins Company Inc., Saginaw, Mich.

Application November 10, 1934, Serial No. 752,507
In Great Britain November 10, 1933

11 Claims. (Cl. 107—7)

This invention relates to means for discharging biscuits or like articles from loose pans or trays on which the biscuits or the like are baked or otherwise treated. Although the invention may be applied to articles other than biscuits, for convenience the invention will be described hereinafter solely with reference to biscuits.

The object of the present invention is to provide automatic apparatus for discharging biscuits from loose pans or trays or conveyors which may be separately fed thereto by hand or otherwise, an aim of the invention being to discharge the biscuits without inversion substantially in the same alignment as that in which they lie before discharge, to facilitate subsequent stacking.

According to the invention loose pans are forwarded by a supply conveyor on a slight declivity and engaged by a biscuit stripping comb which may be arranged on a slight upward incline, and means are provided for oscillating the comb to skip or avoid the leading edge of each advancing pan.

A feature of the invention lies in the provision of slotted abutment bars which locate the pans on the supply conveyor and which act as abutments for each rear row of biscuits on the pans when being engaged by the comb, while the slots in the bars enable the comb to pass through or partially through the slots in order that the comb may complete its lifting or stripping operation effectively upon the last row of biscuits on each pan.

A further feature of the invention consists in a device adapted to set back the front row of biscuits on each pan a predetermined distance with a view to ensuring an adequate margin for the comb operation in advance of the first row of biscuits on each pan. This device may comprise a shutter rake member synchronized with the travel of the pans and adapted to descend in front of the first row of biscuits and hold them back for a moment while the pan advances a fraction underneath. A guard may be provided which is adapted to prevent the biscuits in rear of the comb from rising or buckling up during the action of the shutter rake.

The biscuits slide up the stripping comb in close order, being pushed by the biscuits in rear due to their weight and/or adhesion to the pan, whilst the last row of biscuits is advanced by the slotted bar referred to above.

According to a further feature a device may be employed which is adapted to apply a top drive to the biscuits or prevent a retrograde movement of the biscuits by frictional contact therewith. This device may comprise a driven endless belt or apron of felt or the like (or a series of laterally adjacent belts) of which the under part of a forward loop rests of its own weight on the biscuits so as to impart a frictional drive thereto. As the biscuits leave the comb they are propelled onto a delivery conveyor.

The invention also consists in a machine for discharging biscuits from a travelling surface such as a steel oven band conveyor, comprising a biscuit stripping element or comb adapted to engage the surface, and apron means travelling at the same rate as the surface and adapted frictionally to engage the biscuits on said surface at the delivery end thereof to apply a top drive to the biscuits or prevent a retrograde movement.

In the accompanying drawings which illustrate a machine according to the invention:

Figures 1 and 1a are an elevation.

Figures 2 and 2a a corresponding plan.

Figure 3 is a cross section adjacent the conveyor for discharging the empty pans.

Figure 4 is a side elevation of certain parts to an enlarged scale.

Figure 5 is a diagrammatic view of a modification as applied to a travelling oven band.

Figure 1:
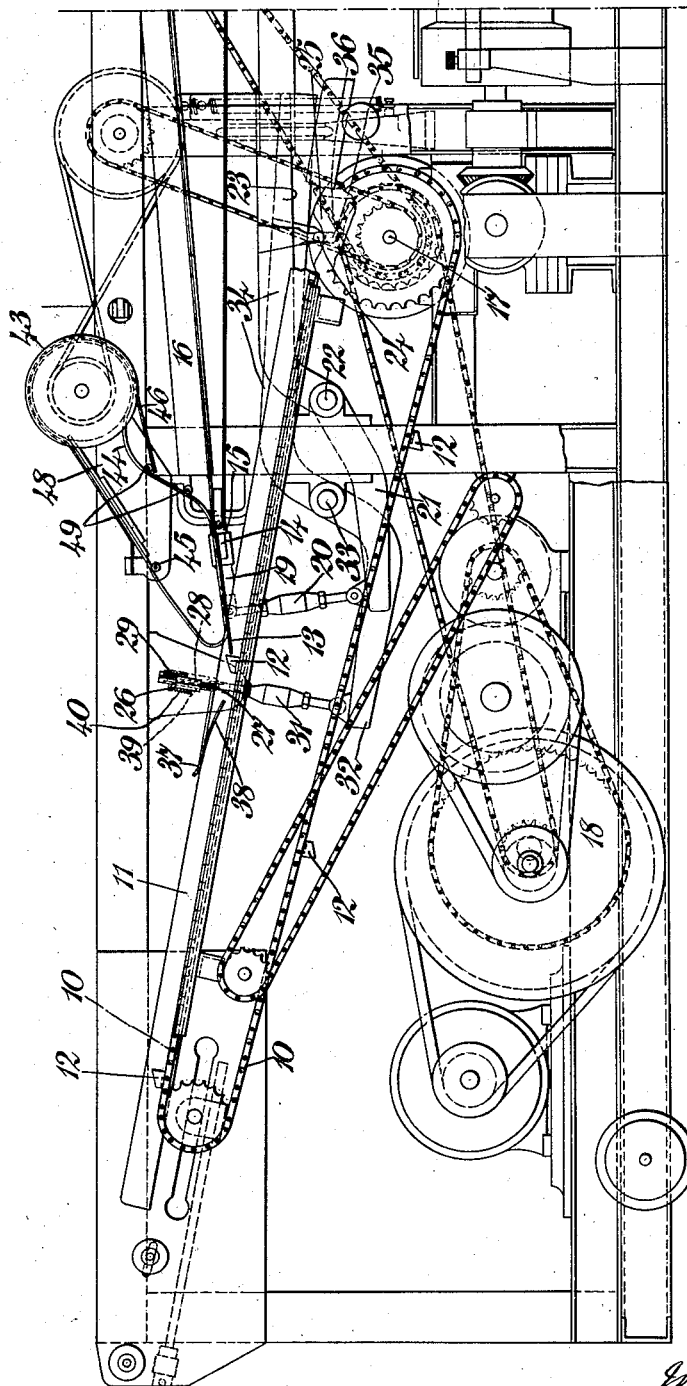

In carrying the invention into effect according to one convenient mode, a supply conveyor in the form of a pair of chains 10 is arranged for the reception of biscuit pans of the smooth plate type. The chains are located between side guiding angle bars 11 on which the pans are supported and are driven from the shaft 17, which is coupled to the driving gear 18. The chains are provided with a series of spaced transverse slotted bars 12, the spacing interval of which is equal to or slightly greater than the length of the pans so that such may be located between the bars. The bars 12 are of wedge shape in cross section, the forward narrow edge being provided with slots or notches 12a. Intermediate the slots vertically rising fins 12b are mounted on the bar. The bars 12 at their ends are adapted to ride over the guide angles 11. The pan conveyor is arranged on a downward incline which preferably makes with the horizontal an angle of about 10°. In order to position the pans laterally and align them with respect to the stripping comb, described below, guide means, for example leaf springs or spring-pressed strips, may be positioned to engage one or both lateral edges of the pans.

Intermediate the ends of the conveyor a transverse row of resilient fingers 13 is mounted upon an oscillatable bar 14, carried in bearings 15. These fingers constitute a resilient comb element which is adapted to strip the biscuits from the pans as they pass downwardly on the chain conveyor and underneath the comb. The fingers 13 can be suitably made of thin spring steel and their forward ends may be pointed or knife edged. The rear ends of the fingers are mounted in the oscillating bar 14, so that the surface of the fingers lies flush with that of the bar. The bar and the rear ends of the fingers may be profiled so that a slight upward gradient is given to the biscuits in order to clear a delivery conveyor 16, onto which the biscuits are adapted to be pushed when the near edge of the conveyor is in a slightly elevated position.

The oscillation of the comb bar 14 is effected by any known means such, for example, as cam means operating in synchronism with the passage of the slotted bars so that the forward edge of the comb is raised to bridge over or jump the leading edge of each advancing pan. Thus, the bar 14 is provided with forwardly extending arms 19 connected by adjustable links 20 to levers 21, mounted upon a rock shaft 22. The rock shaft also carries a lever 23 provided with a roller 24 engaging a cam 25 carried by the shaft 17. As the leading edge of a pan passes under the extremities of the comb fingers 13, the comb descends upon the pan and is pressed thereon by the residual downward oscillation of the bar and resilience of the comb. It will be appreciated that the fingers in operation are curved and the rear part forms a ramp, a suitable angle for which has been found to be in the neighborhood of 7°.

The comb is arranged so that with respect to the chain the points of the fingers lie on either side thereof and the slotted bar 12 is correspondingly positioned so that the teeth of the comb will pass through the slots. This arrangement ensures that in the absence of a pan the adjacent fingers of the comb will not accidentally engage a chain.

In some cases where biscuits are baked or laid upon the pans close to the leading edge thereof it becomes necessary, in order to ensure that the comb shall have an adequate margin in which to act, to set the first row of biscuits back a short step. This may be effected by providing a transverse bar 26 bridging the pans on the supply conveyor, which carries a shutter rake or series of shutter elements 27 which are slidable normal to the pan surface. The shutter elements 27 are slidably located in slots 28 in the bar 26 and are pressed downwardly by springs 29, stops being provided to limit the relative downward movement. The shutter bar 26 is guided in slots in the side frames 30 and is positively raised and lowered by a cam or any other known means in synchronism with the passage of the pans. For this purpose the shutter bar is connected by adjustable links 31 to levers 32 carried by a rock shaft 33. This rock shaft also carries a lever 34 provided with a roller 35 engaging a cam 36 mounted upon the shaft 17.

As the forward edge of a pan arrives beneath the shutter elements 27 the shutters descend and resiliently press upon the pan. The forward motion of the pan continues for a moment before the shutters rise. During this period the biscuits are set back by the shutters a corresponding amount.

If the biscuits adhere closely to the pan there may be a danger of the row of biscuits operated upon by the shutter elements or the biscuits in rear, rising or buckling up and to prevent this a series of guard plates 37 (or a single full width plate) may be arranged so that they lie parallel to but in spaced relation from the plane of the biscuits. These guard plates may be provided beneath with weak leaf springs 38, for lightly engaging the tops of the biscuits. The guard device may be located permanently in position but is preferably raised and lowered with the shutter device.

According to a convenient arrangement the guard plates 37 are resiliently mounted upon the shutter bar 26. The guards are of angled form and sliding in slots 39 in the bar 26 and are pressed downwardly by springs 40, stops being provided for limiting their relative downward movement.

As the biscuits are stripped from the pan by the fingers 13 they are pushed up the comb in close order by the biscuits in rear due to their weight and/or their adhesion to the pans. When the fingers meet the last row of biscuits the tendency is to give the biscuits a retrograde movement until they engage the slotted bar 12, which acts as an abutment therefor and pushes them up the inclined comb. The comb continues its stripping action under this last row of biscuits until it enters the slots 12a of the bar, thus affording ample opportunity for this last row of biscuits to be positively controlled and located even when the comb rises. Immediately the comb has entered the slots to a sufficient distance it is raised by the oscillation of its bar 14 through the cam 25 and skips the leading edge of the next pan and descends into position on the margin of such pan for engaging the advancing row of biscuits which may have been set back a suitable extent for this purpose.

As mentioned above the biscuits in riding up the comb ramp are discharged upon an endless band conveyor 16, which should travel at a rate faster than the conveyor chains 10 (for example about 15 per cent. faster) for the purpose of respacing the biscuits. The near edge of the conveyor 16 is adjustable vertically so that the level of the conveyor at the receiving point for the biscuits may be slightly depressed in relation to the comb or slightly elevated. The conveyor 16 may be depressed when dealing with rectangular biscuits so that should any misalignment take place on the comb or earlier the tipping descent of the biscuits onto the conveyor will square up their edges. In some cases it may be desirable slightly to elevate the edge of the delivery conveyor in order to assist or draw up the row of biscuits at the top of the comb ramp.

The delivery conveyor 16 discharges the biscuits under long resilient or flexible weighted fingers 41 onto a collecting conveyor travelling at a slower rate and at a slightly lower level so that the biscuits are laid thereon in overlapping relationship or in what may be called an inclined stack such as is convenient for collecting by hand.

The emptied pans from which the biscuits have just been stripped pass on downwardly under the comb and may be shot or guided into a receptacle to lie therein in stacked relation for removal or may be guided onto a cross conveyor 42 which delivers them to the side of the machine.

A top feeding device may be employed to aid in the travel or alignment of travel of the biscuits up the incline of the comb and to assist in their rectilinear discharge from the comb ramp onto the delivery conveyor. For this purpose a driving roller 43 may be mounted across the machine and have a series of laterally adjacent endless aprons 44 of felt or other material mounted thereon so that a drive is communicated to the aprons by the roller. The upper laps of the aprons are supported, for example, upon a small roller 45, and the lower laps adjacent the guiding roller may be supported by a guard 46, which is located partially concentric with the roller 43, and by small rollers 49 being such that the forward bights of the aprons form a series of loose loops 47 adapted to lie lightly upon the biscuits upon the inclined comb or upon the upper portion thereof and partly over the delivery conveyor 16. By this arrangement a top drive or frictional assistance is given to the biscuits in riding up the incline of the comb and during their transmission to the delivery conveyor. If desired, the frame 48 supporting the apron device may be pivoted so that it may be raised out of contact with the biscuits when it is not required.

According to a modified arrangement in which the slotted bars as an abutment for the last row of biscuits may be dispensed with, and in which the shutter means may not be necessary, the apron means may be of such length as to ride over a part of the pan adjacent the comb element so that the biscuit will be positively driven onto the comb by the combined action of the pans travelling beneath the comb and the frictional drive of the aprons upon the biscuits.

This form of the invention may be utilized for collecting biscuits from a conveyor such as a steel oven band as shown diagrammatically in Figure 5. The comb element or plate 50 is pivotally or adjustably mounted and is adapted to engage the band 51 adjacent the point where it turns over the end roller 52. The plate may be substantially horizontal or only slightly inclined and during the operation its edge is maintained in contact with the band or in close proximity thereto. The aprons 53 (or a full width apron) are adapted to overlie the comb or plate 50 and a suitable portion of the band 51 so that the combined drive of the band and aprons cause the biscuits to travel onto the plate and to the delivery conveyor 54. The aprons may also overlie a portion of the delivery conveyor.

Although the invention has been described with reference to baking pans, i. e. smooth surface plate elements, it may be applied to reticulated supports such as are known as "wires" in the biscuit art by the shaping of the extremities of the comb teeth to ride the mesh of the wires; for example the underside of the teeth may have curved grooves to accommodate the wire elements or they may be connected in groups to afford mutual support.

I claim:

1. In a machine for discharging biscuits from pans by the aid of stripping fingers beneath which the pans travel by conveyor means, in combination, a series of transverse slotted bars, one for each pan, secured to the conveyor crosswise thereof at the rearward edge of the pan and each arranged and adapted to act as an abutment for positioning the pan, and also for retaining the rear row of biscuits on said pan, the slots of said bar presenting openings permitting passage therethrough of the ends of the stripping fingers during the travel of the bars.

2. A structure as set forth in claim 1 wherein shutter means, mounted to reciprocate in a path substantially normal to the pans are provided for setting back the leading row of biscuits on each pan during the action of said bar, said shutter means comprising spring-pressed elements slidably mounted on a liftable bar extending above and transverse to the direction of travel of the pans, and guard plates on said bars and extending above the biscuits.

3. In combination, conveyor means for carrying biscuit pans, bars on said conveyor means, presenting abutments for said pans, and abutments for aligning the rear row of biscuits on said pans, and having slots for the passage therethrough of stripping fingers, a bar located above the path of travel of the pans, spring pressed shutter means mounted in the bar, guard plates operatively associated with the shutter means and substantially parallel to and in spaced relation to the plane of the biscuits to prevent their buckling upward.

4. A structure as set forth in claim 3 wherein weak spring members are located beneath the said guard plates and are arranged to lightly engage the tops of the biscuits.

5. In a machine for discharging biscuits from traveling pans, including a stripping comb having upwardly inclined stripping fingers, in combination, a top drive to the biscuits on the stripping fingers comprising a transverse series of endless belts passing over a driving roller and presenting a series of loose traveling loops overlying the stripping fingers and adapted to lie lightly upon the biscuits and assist them in riding up the incline of the comb.

6. A structure as set forth in claim 5 having a guard element partially concentric with the driving roller and supporting a portion of said belts rearwardly of said stripping fingers.

7. A structure as set forth in claim 5 having a guard element partially concentric with the driving roller, the said apron and guard element being mounted on a pivoted frame for removal of the apron from engagement with the biscuits.

8. Mechanism for stripping biscuits from longitudinally movable biscuit pans, having, in combination, spring pressed shutter means located above the path of travel of the pans in advance of the stripping mechanism, and guard plates operatively associated with the shutter means and positioned substantially parallel with and in spaced relation to the plane of biscuits on said pans.

9. A structure as set forth in claim 8 wherein weak spring members are secured to the said guard plates and arranged beneath the same to lightly engage the tops of the biscuits.

10. In a machine for discharging biscuits from pans, having conveying means for the pans; in combination, bars fixed transversely to said conveying means, successive bars being spaced apart in the direction of travel, the spacing interval being approximately equal to the length of a pan; each bar having its advancing edge formed with slots spaced apart, and having fins intermediate the slots, said fins projecting forwardly of said slots and also upwardly above the level of the pans; spring fingers mounted above the conveyor arranged to rest their tips upon the pans in spaced relation and in alignment with the slots of said bar; and means operatively synchronized with the movement of the conveyor, arranged and adapted to lift the fingers when their tips are received in the slots of said bar during the advance of the latter.

11. In a machine for discharging biscuits from traveling pans, including a stripping comb having upwardly inclined stripping fingers, in combination, a top drive to the biscuits on the stripping fingers comprising a transverse endless belt, passing over a driving roller and presenting a loose traveling loop overlying the stripping fingers and adapted to lie lightly upon the biscuits and assist them in riding up the incline of the comb.

ROBERT FRENCH MACFARLANE.